United States Patent [19]
Doyle

[11] Patent Number: 5,815,071
[45] Date of Patent: Sep. 29, 1998

[54] METHOD AND APPARATUS FOR MONITORING PARAMETERS OF VEHICLE ELECTRONIC CONTROL UNITS

[75] Inventor: Thomas F. Doyle, San Diego, Calif.

[73] Assignee: QUALCOMM Incorporated, San Diego, Calif.

[21] Appl. No.: 766,217

[22] Filed: Dec. 12, 1996

Related U.S. Application Data

[63] Continuation of Ser. No. 398,234, Mar. 3, 1995, abandoned.

[51] Int. Cl.$^6$ .............................. B60Q 1/00; G08C 19/00
[52] U.S. Cl. .................. 340/439; 340/539; 340/825.69; 701/29; 701/35; 364/550
[58] Field of Search ...................................... 340/439, 438, 340/457.4, 825.54, 539, 825.69; 364/424.04, 424.03, 551.01, 550; 701/29, 30, 35

[56] References Cited

U.S. PATENT DOCUMENTS

| | | | |
|---|---|---|---|
| 3,656,099 | 4/1972 | Campell | 340/466 |
| 4,188,618 | 2/1980 | Weisbart | 364/424.04 |
| 4,671,111 | 6/1987 | Lemelson | 340/439 |
| 4,926,331 | 5/1990 | Windle et al. | 364/424.03 |
| 4,939,652 | 7/1990 | Steiner | 364/424.03 |
| 5,157,610 | 10/1992 | Asano et al. | 340/439 |
| 5,394,136 | 2/1995 | Lammers et al. | 364/424.04 |
| 5,400,018 | 3/1995 | Scholl et al. | 340/438 |
| 5,442,553 | 8/1995 | Parrillo | 364/424.03 |

FOREIGN PATENT DOCUMENTS

| | | |
|---|---|---|
| 2263376 | 7/1993 | United Kingdom . |
| 2273580 | 6/1994 | United Kingdom . |

*Primary Examiner*—Donnie L. Crosland
*Attorney, Agent, or Firm*—Russell B. Miller; Thomas M. Thibault

[57] ABSTRACT

A system for monitoring and adjustment of control unit parameter settings of vehicle electronic control units. The monitoring system may be implemented in a vehicle in which are incorporated one or more electronic control units for regulating one more operational parameters of the vehicle in accordance with corresponding control unit parameter settings. In an exemplary implementation the vehicle is equipped with a mobile communications terminal (MCT), which receives from a base station a list of operational parameters to be monitored. Each of the electronic control units, as well as a memory unit, are connected to an internal data link of the vehicle. When a parameter value within the memory unit corresponding to a given control unit is changed, a message is provided to the base station specifying the value currently registered by the control unit. The currently registered value is then compared to an expected parameter value, and an error message is generated if disagreement exists therebetween. The system also allows vehicle control unit parameter settings to be adjusted from a remote location such as a base station. The MCT of each vehicle is disposed to generate message packets containing updated control unit parameter information received from the base station. The message packets are then sent to a selected electronic control unit over the data link, thereby allowing the updated control unit parameter information to be loaded therein.

16 Claims, 3 Drawing Sheets

METHOD AND APPARATUS FOR MONITORING PARAMETERS OF VEHICLE ELECTRONIC CONTROL UNITS

This is a continuation of application Ser. No. 08/398,234, filed Mar. 3, 1995, now abandoned.

BACKGROUND OF THE INVENTION

I. Field of the Invention

The present invention relates to vehicle electronic control systems. More specifically, the present invention relates to a novel and improved method and apparatus for monitoring and adjusting operating parameters of such electronic control systems in a manner which facilitates centralized parameter control.

II. Description of the Related Art

Recently, fleets of trucking and delivery vehicles have been equipped with a variety of electronic control units for regulating various vehicle operating characteristics. Examples of such characteristics, or "parameters", include maximum vehicle speed, maximum engine speed (RPM), cruise control limits, and the like. The vehicle electronic control units (ECUs) are typically connected to an internal vehicle data link, over which digital information is transferred to and from the ECUs.

The level at which each operational parameter is to be maintained is determined by adjusting one or more "parameter settings" of each ECU. Typically, a portable computer or the like is used to manually set the operational parameters of each ECU. This is achieved by connecting the portable computer to a serial port of the data link, through which parameter settings are transferred and conveyed via the data link to specified ECUs. Unfortunately, such manual parameter adjustment requires either that each vehicle within a fleet periodically visit the host facility, or that other arrangements be provided for physical transport of the portable computer and/or skilled personnel to each vehicle location. Besides being inconvenient, such manual techniques for setting operational parameters are subject to human error.

Another difficulty encountered in the area of vehicle fleet administration is that of ensuring that ECU parameter settings are maintained at appropriate levels for all vehicles within the fleet. Since various incentives often exist for vehicle drivers to alter ECU parameter settings, driver tampering has been found to be a significant cause of the disparity between desired ECU parameter settings and those actually in effect throughout the fleet. For example, a driver may be motivated to change the ECU parameter setting governing maximum vehicle speed as a means of improving on-time performance. Unfortunately, this type of modification to ECU parameter settings often adversely impacts fuel efficiency and other operational characteristics bearing upon fleet profitability.

Efforts to conform ECU parameter settings to desired levels have hitherto consisted of manually tracking the ECU parameter settings of the control units within each fleet vehicle. This has proven to be an expensive, time-consuming task for administrators of large vehicle fleets. In addition, it is anticipated that the increasing complexity of on-board vehicle electronics will lead to other adverse consequences arising from improper ECU settings.

Accordingly, it is an object of the invention to provide a system for efficiently monitoring the parameter settings of electronic control units incorporated within commercial or fleet vehicles.

It is another object of the invention to provide a system allowing a central processing facility to remotely request adjustment of the parameter settings of the electronic control units within selected fleet vehicles.

SUMMARY OF THE INVENTION

In summary, these and other objects are met by a system for monitoring parameter settings of vehicle electronic control units. The inventive monitoring system may be implemented in a vehicle in which are incorporated one or more electronic control units for regulating one more operational parameters of the vehicle in accordance with corresponding control unit parameter settings. In an exemplary implementation the vehicle is equipped within a mobile communications terminal (MCT), which receives from a base station a list of operational parameters to be monitored. Each of the electronic control units, as well as a memory unit, are connected to an internal data link of the vehicle. The contents of the memory unit are periodically updated to reflect the parameter settings registered by each control unit. When a parameter value within the memory unit corresponding to a given control unit is changed, a message is provided to the base station specifying the value currently registered by the control unit. The currently registered value is then compared to an expected parameter value provided by a base station operator, and an error message is generated if disagreement exists therebetween.

In another aspect of the invention, the base station is configured to monitor messages received from a given vehicle when an expected parameter value for the vehicle is changed within the base station database. If the base station does not receive a message from the given vehicle specifying the expected parameter value within a predetermined time period subsequent to authorization being provided to the vehicle to change the parameter value, then an error message is provided to the base station operator.

In another aspect, the present invention allows vehicle control unit parameter settings to be adjusted from a remote location such as a base station. Each vehicle is again equipped with a mobile communications terminal (MCT) for receiving updated control unit parameter information transmitted by the base station. Each terminal is connected to an internal vehicle data link, and each is disposed to generate message packets containing updated control unit parameter information received from the base station. The message packets are then sent to a selected electronic control unit over the data link, thereby allowing the updated control unit parameter information to be loaded therein. When a parameter value within the memory unit of a given control unit is updated, a message is provided to the base station specifying the updated value registered by the control unit. If the message is not received at the base station within a predefined time window, the base station operator is provided with an error message.

In an alternate implementation, the base station transmits timing information identifying a time window during which the message packets carrying the updated parameter information are to be sent over the data link. In this implementation, an error message is generated if the control unit parameter settings are not received by the selected electronic control unit during the time window.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF THE PREFERRED EMBODIMENTS

I. Introduction

The various techniques contemplated by the present invention for monitoring and adjustment of the parameter settings of vehicle electronic control units (ECUs) are well-suited for implementation within vehicle fleets in radio communication with a base station or host processing facility. Although the techniques described herein are of utility even in the absence of such a radio communications link, the existence thereof facilitates real-time monitoring and adjustment of control unit parameter settings, and improves efficiency by obviating the need for reliance upon conventional manual techniques. Accordingly, a background description will initially be provided of an exemplary radio communications network facilitating information exchange between a base station and a vehicle fleet.

Figure 1:
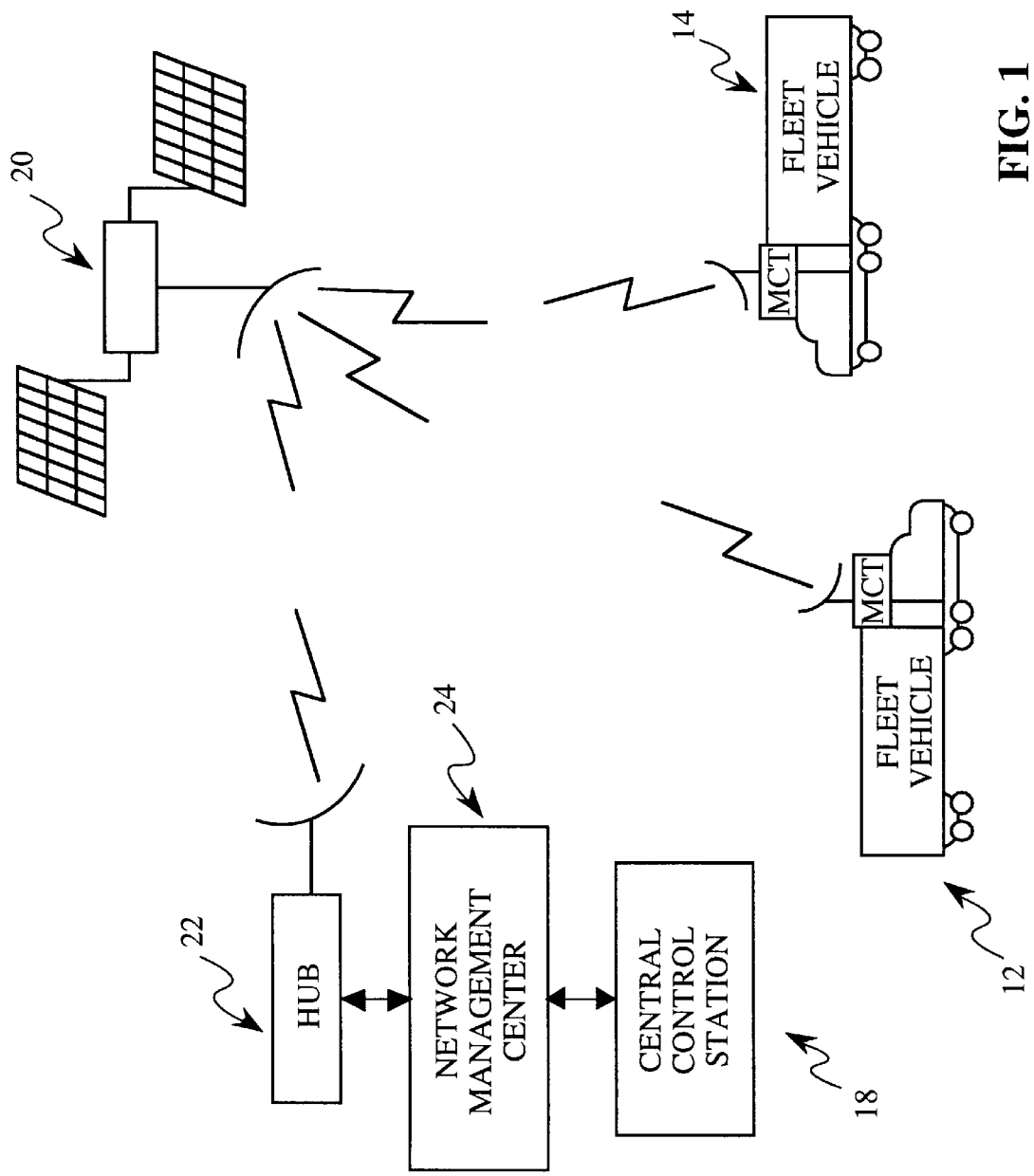
FIG. 1 depicts an exemplary implementation of a mobile communications network.

Referring to FIG. 1, the mobile communications network may comprise, for example, a conventional cellular communication system designed to provide service between user vehicles within specified geographic areas, or "cells". Alternately, the present invention may be embodied within a satellite communication system of the type capable of facilitating communication between one or more central control stations and a plurality of user vehicles distributed over a wide geographic area. Such a satellite-based message communication system is described in, for example, U.S. Pat. No. 4,979,170, entitled ALTERNATING SEQUENTIAL HALF DUPLEX COMMUNICATION SYSTEM, which is assigned to the assignee of the present invention and which is herein incorporated by reference.

Referring now to FIG. 1 in greater detail, an overview is provided of a communication network 10 within which fleet vehicles 12, 14 communicate with central control station 18. In FIG. 1, fleet vehicles 12, 14 each have a mobile communications terminal (MCT). Fleet vehicles 12, 14 are representative of any of a variety of vehicles (e.g., freight trucks) whose drivers or other occupants desire to obtain occasional or updated information, status reports, or messages from central control station 18. Although the communication network of FIG. 1 relies upon a satellite communication link between vehicles 12, 14 and central control station 18, it is again noted that the teachings of the present invention are equally applicable to terrestrial cellular or mobile radio communications systems in which communication is established between a central facility and one or more mobile units.

The mobile communications terminal (MCT) of each fleet vehicle also allows the vehicle driver or occupant to communicate via satellite at least some form of limited message or acknowledgment to the central control station in response to received messages. A reply message may prevent the need for further communications or may indicate a need for an additional instruction or updated message from new information provided by a vehicle driver. The return link allows a driver to send messages via the mobile communications terminal such as a verification of time and delivery information, or a report on current position or other status information.

As is described hereinafter, in a preferred embodiment of the invention each MCT comprises a controller, or like electronic processor, and a communications transceiver for facilitating communication with a base station. In one aspect of the invention, the MCT controller is programmed to use the internal vehicle data link to transfer updated parameter information received from the base station to selected vehicle electronic control units (ECUs). This eliminates the need for time-consuming, error prone manual methods of parameter adjustment.

In another aspect of the invention, the MCT controller functions as a digital comparator to identify discrepancies between desired ECU parameter values and those parameter settings actually registered by each ECU connected to the data link. Upon detection of disagreement between the desired ECU parameter values and the current ECU parameter settings, the MCT sends an error message to a base station or host processing facility. This instantly alerts system operators to the errant parameter settings currently registered by one or more vehicle ECUs, and thereby greatly simplifies the administrative task of monitoring the ECU parameter settings for an entire vehicle fleet.

Referring now to FIG. 1 in greater detail, messages from the mobile communications terminals of vehicles 12, 14 are transmitted to satellite 20 and relayed thereby to a central transmission facility or terminal 22 referred to as a Hub facility. Central terminal or Hub 22 can be placed at a location approximate central control station 18 allowing lower cite costs and local, direct access to transmission equipment for maintenance and system upgrade. Alternatively, Hub 22 is located in a remote location more ideally suited for low interference ground-to-satellite transmission or reception. In this case, a telephonic, optical or satellite communication link is utilized to establish communication either directly between Hub 22 and central control station 18, or alternately between Hub 22 and central control station 18 by way of a network management center (NMC) 24. When messaging is to take place not only between the vehicles 12, 14 and central control station 18, but also between vehicles 12, 14 and one or more service provider control stations 28, network management center 24 enables more efficient control over the priority, access, accounting, and transfer characteristics of message data. Additional details of the communication hardware utilized in an exemplary implementation of Hub 22 and network management center 24 are described in the aforementioned U.S. Pat. No. 4,979,170.

II. Monitoring of Vehicle Electronic Control Unit (ECU) Parameter Settings

Figure 2:
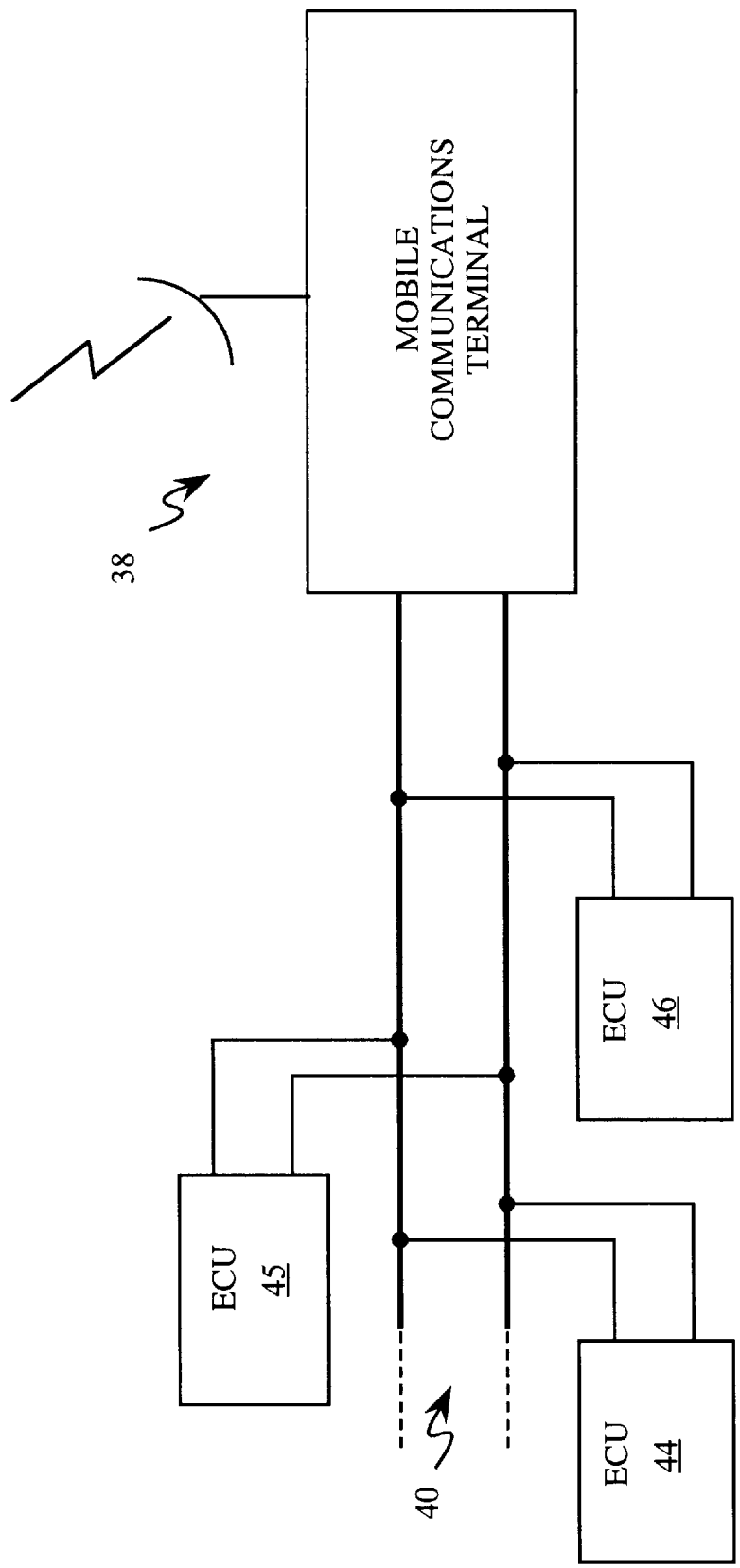
FIG. 2 shows a block diagrammatic representation of the integration of a mobile communications terminal (MCT) with the electronic control system of an exemplary fleet vehicle.

Referring now to FIG. 2, there is shown a block diagrammatic representation of the integration of a mobile communications terminal (MCT) 38 with the electronic control system of an exemplary fleet vehicle. In FIG. 2, MCT 38 is connected to internal data link 40 of the vehicle upon which it is mounted. Also connected to data link 40 are various electronic control units (ECUs) 44–46, which function to regulate one or more operational parameters. In an exemplary embodiment ECUs 44–46 are responsible for regulating operational parameters such as vehicle speed, engine speed (RPM), cruise control limits, and the like.

Figure 3:
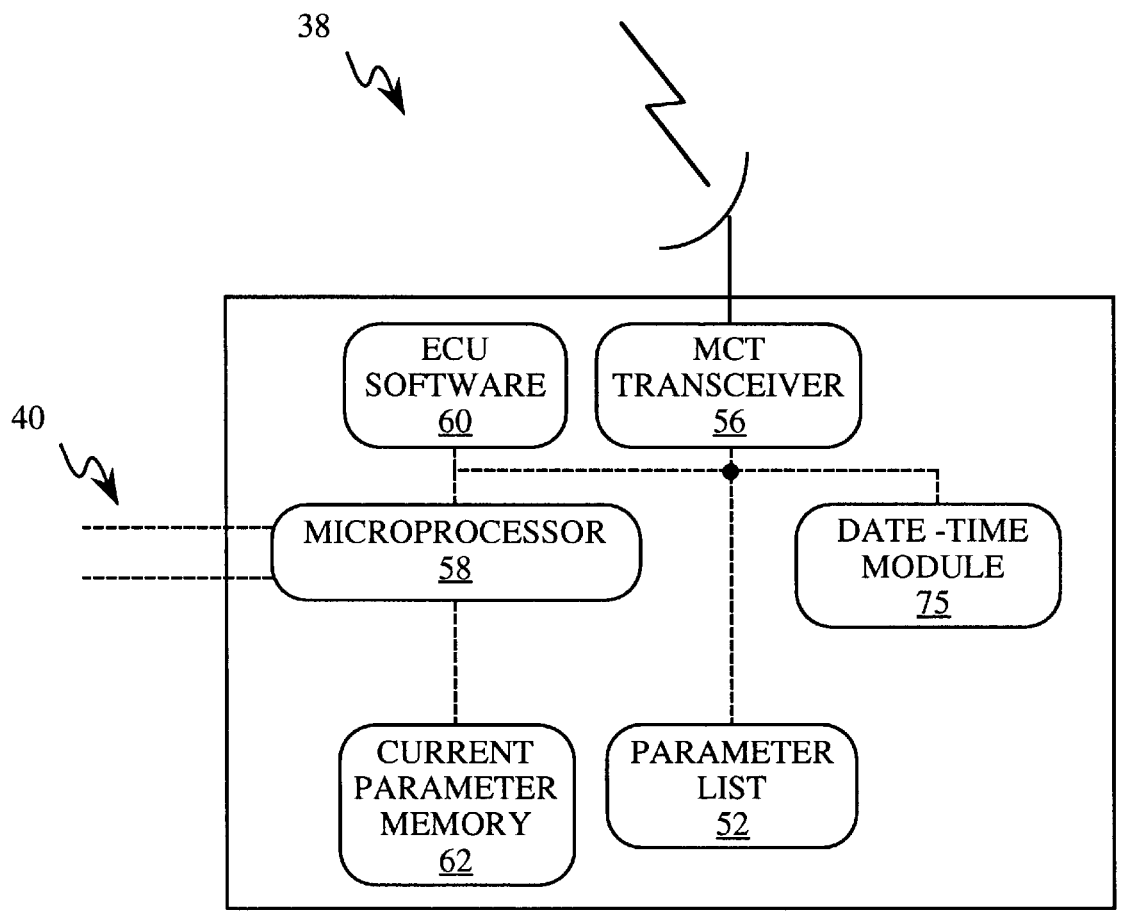
FIG. 3 provides a detailed view of a mobile communications terminal configured for monitoring and adjustment of the parameter settings of vehicle electronic control units.

In FIG. 3, a detailed view is provided of one manner in which MCT 38 may be configured for monitoring and adjustment of the parameter settings of ECUs 44–46. As is indicated by FIG. 3, MCT 38 includes a parameter list memory 52 typically comprised of non-volatile, random access memory (RAM). Stored within the parameter list memory 52 is a list of operational parameters to be monitored via the data link 40. This list is stored within parameter list memory 52 after being received by MCT transceiver 56 during communication with a base station or central processing facility (FIG. 1). MCT 38 further includes microprocessor 58 which, in addition to performing various other control functions, directs communication with the ECUs over data link 40. Microprocessor 58, in conjunction with ECU parameter monitoring/modification software 60, will hereinafter be referred to as the MCT controller.

In accordance with one aspect of the invention, the MCT controller periodically queries each ECU 44–46 as to its current parameter settings. For example, the MCT controller could request that the ECU responsible for regulating maximum engine speed provide an indication of the current setting of a MAX ENGINE RPM parameter. The MCT controller transfers the response to each such ECU parameter query to parameter memory 62. The transfer of current parameter information between ECU's and the MCT controller may be effected in accordance with, for example, standards SAE J1708 and SAE J1587 promulgated by the Society of Automotive Engineers, which respectively provide standardized electrical specifications and messaging protocols for internal vehicle data links. The SAE J1587 messaging protocol provides the format and transmission interval for communication of data packets capable of transferring the ECU parameter data over data link 40 to MCT 38.

In order to enable identification of the vehicle ECU from which parameter data is received, the header of each message packet so utilized includes a unique vehicle control unit message identifier (MID). This allows the ECU parameter data within parameter memory 62 to be organized on the basis of the MIDs corresponding to the constituent vehicle ECUs. The MCT controller regularly compares the current parameter settings registered by ECUs 44–46 to the ECU parameter data within parameter memory 62. When disagreement is detected (i.e., when the parameter setting of an ECU changes in value), the MCT controller generates a message packet specifying the changed value of the parameter setting. In a preferred embodiment, the message packet is marked with a current date and time provided by date-time module 70.

The message packet is then transmitted by transceiver 56 to the base station or host processing facility, thereby alerting system operators to the existence of the changed parameter setting. The received message packet will typically specify the changed parameter setting, the date and time at which the incorrect parameter setting was detected, the particular ECU registering the incorrect setting, as well as the MCT originating the error message. Within the base station, a database is maintained of the parameter settings which ought to be registered by each of the ECUs 44–46. By comparing the changed parameter value specified by the received message packet to the corresponding expected value within this database, those ECUs not registering expected parameter settings may be identified. An error message or the like may then be generated in order to alert fleet operators as to the existence of the potentially erroneous ECU parameter setting. Parameter settings giving rise to such an error condition may then be corrected using either conventional manual procedures (i.e., through direct access to the vehicle data link), or by using the inventive parameter modification technique described below.

It is a feature of the invention that upon initial installation of an MCT within a fleet vehicle, the base station will be able to ascertain the vehicle's parameter settings in one of two ways. If the MCT has not been programmed with default parameter settings, the parameter settings registered by the constituent vehicle ECUs will disagree with the "empty" contents of parameter memory 62. This disagreement causes the MCT to transmit, to the base station, the initial vehicle parameter settings. On the other hand, if the MCT has been programmed with a set of default parameter settings which match those registered by the constituent vehicle ECU, then no disagreement will be detected between the registered settings and the default settings. Hence, a message specifying ECU parameter settings is not transmitted by the MCT to the base station, and the base station infers that the programmed parameters match the MCT's defaults parameter settings.

It should be noted that each message packet identifying a changed parameter setting will not necessarily result in an error condition. As an example, consider the case in which fleet operators desire to uniformly alter the ECU parameter setting MAXIMUM VEHICLE SPEED throughout an entire vehicle fleet. As a first step, the values within the base station database specifying MAXIMUM VEHICLE SPEED for each fleet vehicle would be changed to reflect the new parameter setting. Within each vehicle, the ECU responsible for regulating vehicle speed would be adjusted so as to regulate speed in accordance with the new parameter setting. Following such adjustment, the parameter setting registered by each ECU would change from that stored within parameter memory 62. Accordingly, each vehicle would transmit, to the base station, a message packet specifying the newly registered MAXIMUM VEHICLE SPEED parameter setting. However, since each newly registered setting would agree with the already altered MAXIMUM VEHICLE SPEED entries within the base station database, an error condition would not arise.

In another aspect of the invention, the base station is configured to monitor messages received from a given vehicle when an expected parameter value for the vehicle is changed within the base station database. If the base station does not receive a message from the given vehicle specifying the expected parameter value within a predetermined time period subsequent to authorization being provided to the vehicle to change the parameter value, then an error message is provided to the base station operator.

In an alternate embodiment, the MCT would be programmed to regularly poll (e.g., every few days) the ECUs connected to the data link in order to ascertain the parameter values currently registered thereby. Rather than compare the registered values to those previously stored within a current parameter memory, the MCT would then simply transmit the registered parameter values to the base station. A determination would then be made within the base station as to the accuracy of the currently registered parameter values. This embodiment offers the advantage of eliminating the need to equip the MCT with a current parameter memory (e.g., parameter memory 62) for storing parameter values. The MCT would, however, include a memory unit for identifying those particular ECUs to be periodically polled by the MCT. Similarly, in another implementation the MCT would not even maintain a memory unit for identifying a set of ECUs to be regularly polled, but would instead be directed by the base station to carry out such polling. Again, the parameter values registered by the polled ECUs would be transmitted to the base station, within which a comparison would be made to expected parameter values.

III. Modification of Vehicle Electronic Control Unit (ECU) Parameter Settings In accordance with another aspect of the invention, modification of erroneous or outdated parameter settings is achieved in a manner which obviates the need for direct manual access to either the vehicle electronic control units or to the internal vehicle data link. As mentioned above, parameter information from a base station or host processing facility may be received by transceiver 56. For reasons of safety, various identification information should accompany the updated ECU parameter information provided to the vehicle by the base station. Specifically, such identification information will preferably include precise ECU identification information, authorization for the parameter change(s), and various logical sequences unique to particular ECU's. In addition, it may be necessary that certain vehicle ECU's and/or the MCT controller be able to ascertain particular vehicle status information (e.g., engine not running) in order to ensure that the desired parameter changes be made safely. At least one technique for ensuring that the ECU parameter adjustment information supplied by a base station is communicated only to the appropriate vehicle ECUs is described in copending United States patent application Ser. No. 08/681,342, which is assigned to the assignee of the present invention, and which is herein incorporated by reference.

In an exemplary embodiment the MCT controller transfers the received message information over the vehicle data link utilizing sequences of "free-formatted" message packets of the type specified by SAE standard J1587. Certain ECUs may require two-way communication with the MCT controller, in accordance with a predefined protocol, during the parameter adjustment process.

In a preferred embodiment, the parameter information received by transceiver 56 from the base station is accompanied by timing information specifying a "time window" during which the parameter settings of the specified ECU are to be updated. Again, after being received by transceiver 56 this information is stored within a memory buffer accessible by the MCT controller. The updated parameter information is then transferred to the designated vehicle ECU over data link 40 during the specified time window. If for some reason the parameter settings of the designated vehicle ECU are not adjusted during the time window, an error message is generated by the MCT controller. The error message may then be transmitted to the base station by transceiver 56.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

I claim:

1. Method for monitoring electronic control unit (ECU) parameters to detect tampering of expected ECU parameters in a vehicle which includes an ECU, said ECU being connected to a data link within said vehicle, said ECU having a parameter stored therein for regulating a corresponding operational function of said vehicle, said vehicle being in communication with a remote base station, the method comprising the steps of:

storing a list of initial ECU preset expected operational function regulating parameters within a memory unit within said vehicle, separate from said ECU;

retrieving a current ECU parameter from said ECU within said vehicle at predetermined intervals;

comparing said current ECU parameter to said initial ECU preset expected parameters and detecting disagreement therebetween; and transmitting, to said remote base station, said current ECU parameter which is in disagreement with a corresponding initial ECU preset expected parameter.

2. The method of claim 1 further comprising the steps of:

comparing, at said remote base station, said transmitted ECU parameter to a list of allowable ECU parameter values stored within a second memory unit; and generating an error message indicative of any transmitted ECU parameter which falls outside of said allowable ECU parameter values.

3. The method of claim 1 further including the steps of:

retrieving said ECU parameter from said ECU;

comparing said current ECU parameter to said list of initial ECU preset expected parameters stored within said memory unit and detecting disagreement therebetween; and transmitting, to said remote base station, said current ECU parameter which is in disagreement with said corresponding initial ECU preset expected parameter.

4. The method of claim 3 further comprising the steps of:

receiving, at said remote base station, said current ECU parameter which is in disagreement with said corresponding initial ECU preset expected parameter;

comparing, at said remote base station, said transmitted ECU parameter to a range of allowable ECU parameter values stored within a second memory unit; and generating an error message indicative of said transmitted ECU parameter falling outside the range of said allowable ECU parameter values.

5. The method of claim 1 further including the step of recording current date and time information upon detecting a discrepancy between said initial ECU preset expected parameters and said current ECU parameter.

6. The method of claim 1 wherein one ECU parameter regulates maximum vehicle speed and another ECU parameter regulates maximum engine speed (RPM).

7. Method for modifying electronic control unit (ECU) parameters to detect tampering of expected ECU parameters in a vehicle which includes an ECU, said ECU being connected to a data link within said vehicle, said ECU having a parameter stored therein for regulating a corresponding operational function of said vehicle, said vehicle being in communication with a remote base station by way of a mobile communications transceiver, the method comprising the steps of:

wirelessly transmitting, from said remote base station to said vehicle, a modified operational function regulating ECU parameter;

receiving, by way of said mobile communications transceiver, said modified ECU parameter; and transmitting, over said data link, said modified ECU parameter to said corresponding ECU;

wherein said ECU parameter is modified in accordance with said modified ECU parameter within said corresponding ECU.

8. The method of claim 7 further comprising the step of generating an error message if said ECU parameter change has not taken place within a predetermined time period and transmitting said error message to said remote base station.

9. Apparatus for monitoring electronic control unit (ECU) parameters to detect tampering of expected ECU parameters in a vehicle which includes an ECU, said ECU being connected to a data link within said vehicle, said ECU having a parameter stored therein for regulating a corresponding, operational function of said vehicle, said vehicle being in communication with a remote base station, said apparatus comprising:

an ECU located within said vehicle, said ECU having a programmable parameter for controlling a corresponding operational function of said vehicle;

a memory unit in which is stored an initial ECU preset expected parameter value;

an electronic processor, connected to the data link and to said memory unit, for comparing said initial ECU preset expected parameter value to said current ECU parameter and for detecting differences therebetween; and a mobile communications transceiver for transmitting, to said remote base station, said current ECU parameter which is different than said initial ECU preset expected parameter.

10. The apparatus of claim 9 further comprising:

a transceiver for receiving said current ECU parameter from said vehicle;

a second memory unit located within said remote base station, in which are stored a range of permissible values for said ECU parameter;

a second electronic processor, located within said remote base station, for comparing said current ECU parameter to a range of allowable values corresponding to said ECU parameter and for generating an error message if said ECU parameter falls outside of said range of allowable values.

11. The apparatus of claim 9 further comprising:

recording means, located within said electronic processing unit, for storing the date and time of the occurrence of any detected differences between said current ECU parameter and said initial ECU preset expected parameter value.

12. The apparatus of claim 9 further comprising a first ECU to regulate maximum vehicle speed and a second ECU to regulate maximum engine speed (RPM).

13. Apparatus for monitoring electronic control unit (ECU) parameters to detect tampering of expected ECU parameters in a vehicle which includes an ECU, said ECU being connected to a data link within said vehicle, said ECU having a parameter stored therein for regulating a corresponding operational function of said vehicle, said vehicle being in communication with a remote base station, said apparatus comprising:

an ECU, located within said vehicle, said ECU having a programmable expected operational function regulating parameter for controlling a corresponding operational function of said vehicle;

a first wireless transceiver, located at said remote base station, for transmitting to said ECU changes to said programmable expected operational function regulating parameter;

a second wireless transceiver, located within said vehicle, for receiving said ECU parameter changes and for transmitting a current ECU parameter to said remote base station;

an electronic processing unit, located within said vehicle, for encoding said ECU parameter changes into data packets capable of being processed by said ECU; and a data link, located within said vehicle, for providing data between said ECU and said electronic processor.

14. The apparatus of claim 13 wherein said electronic processing unit is further comprised of:

a memory unit for storing an initial set of ECU programmable expected operational function regulating parameter values;

receiver means for receiving current ECU parameters from said data link at predetermined intervals, from said ECU within said vehicle; and comparator means for comparing said current ECU parameters to said initial set of ECU programmable expected parameter values and for determining differences therebetween.

15. The apparatus of claim 13 wherein said electronic processing unit is comprised of:

timing means for monitoring the elapsed time from an ECU programmable expected parameter change command to the successful alteration of said ECU programmable expected parameter;

wherein an error message is generated by said electronic processing unit and transmitted to said remote base station if said ECU parameter change is unsuccessful within a predetermined time period.

16. The apparatus of claim 13 further comprising a first ECU to regulate maximum vehicle speed and a second ECU to regulate maximum engine speed (RPM).

* * * * *